US009674772B2

(12) United States Patent
Cho et al.

(10) Patent No.: US 9,674,772 B2
(45) Date of Patent: Jun. 6, 2017

(54) METHOD AND APPARATUS FOR ACQUIRING INFORMATION ON ACCESS POINT IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 14/655,675

(22) PCT Filed: Dec. 31, 2013

(86) PCT No.: PCT/KR2013/012403
§ 371 (c)(1),
(2) Date: Jun. 25, 2015

(87) PCT Pub. No.: WO2014/107016
PCT Pub. Date: Jul. 10, 2014

(65) Prior Publication Data
US 2015/0358895 A1 Dec. 10, 2015

Related U.S. Application Data

(60) Provisional application No. 61/748,448, filed on Jan. 3, 2013.

(51) Int. Cl.
*H04W 48/16* (2009.01)
*H04W 88/16* (2009.01)
(Continued)

(52) U.S. Cl.
CPC ........... *H04W 48/16* (2013.01); *H04W 24/02* (2013.01); *H04W 88/16* (2013.01); *H04W 92/12* (2013.01); *H04W 92/14* (2013.01)

(58) Field of Classification Search
None
See application file for complete search history.

(56) References Cited

U.S. PATENT DOCUMENTS

2010/0208704 A1* 8/2010 Wu .................. H04L 12/66
370/331
2011/0216743 A1* 9/2011 Bachmann ............ H04L 63/164
370/331

(Continued)

FOREIGN PATENT DOCUMENTS

KR 10-2006-0084002 7/2006
KR 10-2009-0030008 3/2009
(Continued)

OTHER PUBLICATIONS

PCT International Application No. PCT/KR2013/012403, Written Opinion of the International Searching Authority dated Mar. 26, 2014, 1 page.

*Primary Examiner* — Diane Lo
(74) *Attorney, Agent, or Firm* — Lee Hong Degerman Kang & Waimey

(57) ABSTRACT

A method and apparatus for acquiring information on an access point (AP) in a wireless communication system is provided. An AP information management entity of a cellular system transmits a request for information on an AP, which is located within coverage of an eNodeB (eNB), to an AP server which is located outside of the cellular system, and receives a response, which includes a result code of the request, from the AP server. The AP information manage- (Continued)

ment entity is one of an eNB, mobility management entity (MME), or a new entity of the cellular system.

11 Claims, 14 Drawing Sheets

(51) Int. Cl.
   *H04W 24/02*   (2009.01)
   *H04W 92/12*   (2009.01)
   *H04W 92/14*   (2009.01)

(56) References Cited

U.S. PATENT DOCUMENTS

| | | | |
|---|---|---|---|
| 2011/0280227 A1 | 11/2011 | McCann et al. | |
| 2014/0189790 A1* | 7/2014 | Mindler | H04L 67/02 |
| | | | 726/3 |

FOREIGN PATENT DOCUMENTS

| | | |
|---|---|---|
| WO | 2012/005469 | 1/2012 |
| WO | 2012/046925 | 4/2012 |

* cited by examiner

FIG. 4

| Frame control | Persistent /ID | Address 1 | Address 2 | Address 3 | Sequence control | Address 4 | Sequence control | QoS control | HT control | Frame body | FCS |

FIG. 12

| Destination IP : S-GW IP | Source IP : eNB IP Y | GTP-TEID for UL | Destination IP : AP server IP | Source IP : eNB IP X | secondary RAT configuration acquisition service setup request |
|---|---|---|---|---|---|

Tunneling Header (covers first three fields)

METHOD AND APPARATUS FOR ACQUIRING INFORMATION ON ACCESS POINT IN WIRELESS COMMUNICATION SYSTEM

CROSS-REFERENCE TO RELATED APPLICATIONS

This application is the National Stage filing under 35 U.S.C. 371 of International Application No. PCT/KR2013/012403, filed on Dec. 31, 2013, which claims the benefit of U.S. Provisional Application No. 61/748,448, filed on Jan. 3, 2013, the contents of which are all hereby incorporated by reference herein in their entirety.

BACKGROUND OF THE INVENTION

Field of the Invention

The present invention relates to wireless communications, and more specifically, to a method and apparatus for acquiring information on an access point (AP) in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless LAN (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In a fifth-generation mobile communication system constituted of a plurality of RATs, a primary RAT system needs to grasp the entities of a secondary RAT system that operates within its own coverage. For example, in case that a primary RAT system is a cellular system, and a secondary RAT system is a Wi-Fi system, a cellular node such as an eNodeB (eNB), mobility management entity (MME), or new cellular entity need be aware of which access points (APs) are in step within its coverage. An entity of a secondary RAT system may report information on the entity of the second RAT system to a management device (for example, a management server). An AP information management entity in the cellular system, e.g., eNB, MME, or new entity, may acquire information on APs within an area, which is managed by AP information management entity, from a separate management server. For example, if the AP information management entity is the eNB, the eNB may acquire information on APs within its coverage.

When an AP information management server is located outside of a cellular network, there is a need for a method for acquiring, by an AP information management entity in the cellular network, information on APs from the AP information management server through an interface outside of the cellular network.

SUMMARY OF THE INVENTION

The present invention provides a method and apparatus for acquiring information on access points (APs) in a wireless communication system. The present invention provides a method for acquiring, by an AP information management entity of a primary radio access technology (RAT) system, information on APs in a secondary RAT system from an AP information management server which is located outside of the primary RAT system.

In an aspect, a method for acquiring, by an eNodeB (eNB) of a cellular system, information on an access point (AP) in a wireless communication system is provided. The method includes transmitting a request for information on an AP, which is located within coverage of the eNB, to an AP server which is located outside of the cellular system, and receiving a response, which includes a result code of the request, from the AP server.

The request may be transmitted to the AP server through a mobility management entity (MME) using an S1 application protocol, and the response may be received from the AP server through the MME using the S1 application protocol.

The request may be transmitted to the AP server through a serving gateway (S-GW) and a packet data network (PDN) gateway (P-GW) using a GPRS tunneling protocol (GTP), and the response may be received from the AP server through the S-GW and P-GW using the GTP.

The method may further include transmitting an eNB bearer setup request, including an E-UTRAN radio access bearer (E-RAB) identifier (ID), transport network layer (TNL) address for the eNB, and GTP tunneling identifier (GTP-TEID) for downlink (DL), to an MME, and receiving an eNB bearer setup response, including the E-RAB ID, TNL address for the S-GW, TNL address for the AP server, and GTP-TEID for uplink (UL), from the MME.

The result code of the request may be 'success', and the response further may include the information on the AP.

The information on the AP may include at least one of a media access control (MAC) address of the AP, a service set identifier (SSID) of the AP, a homogeneous extended service set ID (HESSID) of the AP, whether of the AP can be used by a limited user, information on a frequency channel used by the AP, and a position of the AP.

In another aspect, a method for acquiring, by a mobility management entity (MME) of a cellular system, information on an access point (AP) in a wireless communication system is provided. The method includes transmitting a request for information on an AP, which is located within coverage of an eNodeB (eNB) managed by the MME, to an AP server, which is located outside of the cellular system, through a serving gateway (S-GW) and a packet data network (PDN) gateway (P-GW), and receiving a response, which includes a result code of the request, from the AP server through the S-GW and P-GW.

The method may further include transmitting a create session request message to the S-GW for creating a session between the MME and S-GW, and receiving a create session response message from the S-GW.

In another aspect, a method for transmitting, by an access point (AP) server which is located outside of a cellular system, information on an AP in a wireless communication system is provided. The method includes receiving a request for information on an AP to an entity of the cellular system which manages the information on the AP, and transmitting a response, which includes a result code of the request, to the entity of the cellular system.

The AP server may be one of a generic advertisement service (GAS) server using an access network query protocol (ANQP) or a WLAN access gateway (WAG).

The entity of the cellular system may be an eNodeB (eNB), the request may be received from the eNB through a mobility management entity (MME) using an S1 application protocol, and the response may be transmitted to the eNB through the MME using the S1 application protocol.

The entity of the cellular system may be an eNodeB (eNB), the request may be received from the eNB through a serving gateway (S-GW) and a packet data network (PDN) gateway (P-GW) using a GPRS tunneling protocol (GTP), and the response may be transmitted to the eNB through the S-GW and P-GW using the GTP.

The entity of the cellular system may be an MME, the request may be received from the MME through a S-GW and P-GW using a GTP, and the response may be transmitted to the MME through the S-GW and P-GW using the GTP.

Information on APs can be acquired efficiently when an AP information management server is located outside of a cellular network.

BRIEF DESCRIPTION OF THE DRAWINGS

FIG. 4 shows an example of a frame structure of IEEE 802.11.

FIG. 12 shows an example of an IP packet carrying a secondary RAT configuration acquisition service setup request according to another embodiment of the present invention.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
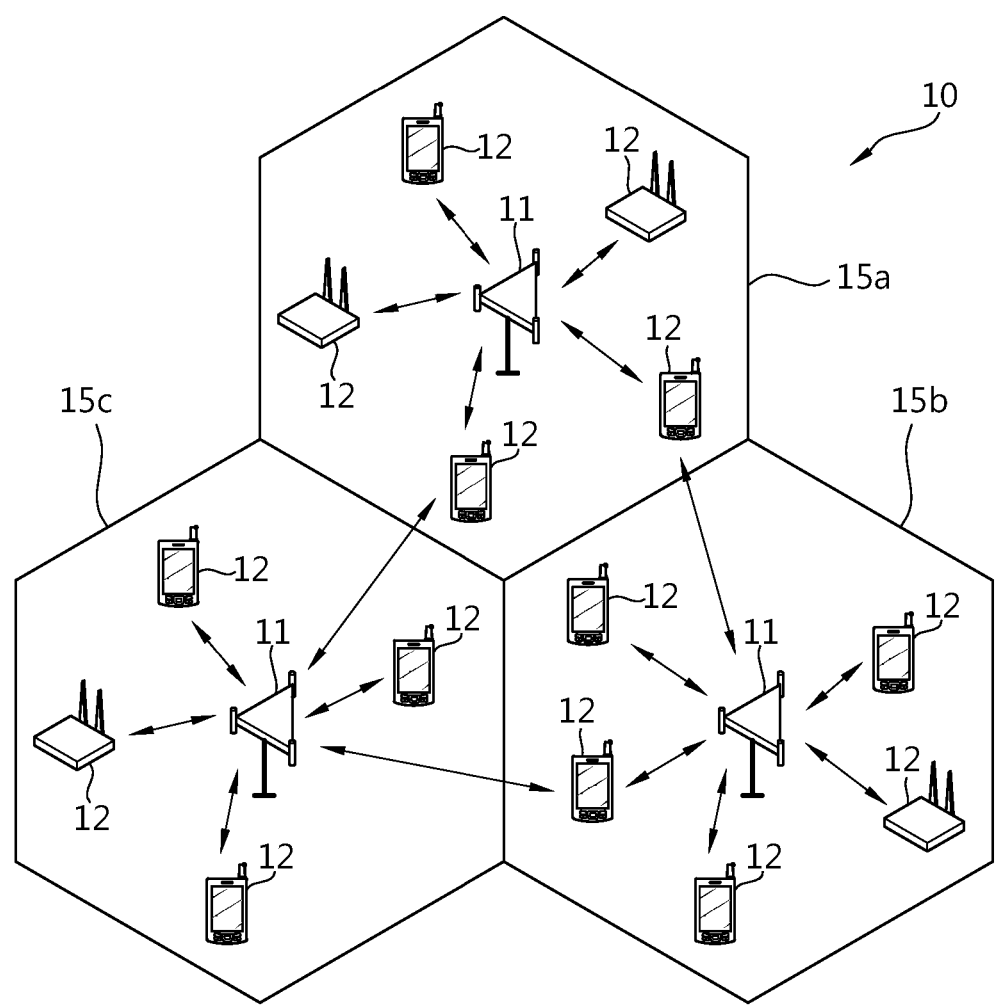
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15*a*, 15*b*, and 15*c*. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
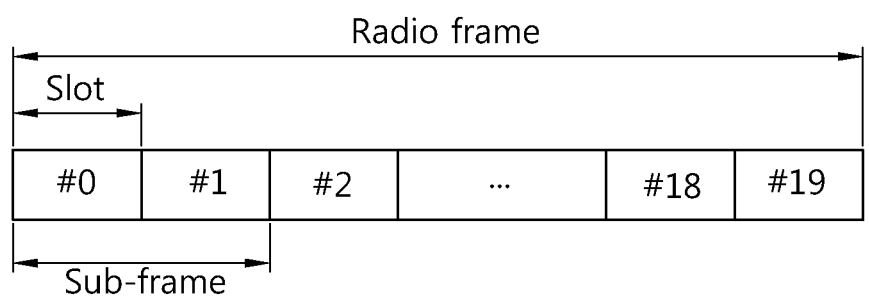
FIG. 2 shows a structure of a radio frame in 3GPP LTE.

FIG. 2 shows a structure of a radio frame in 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
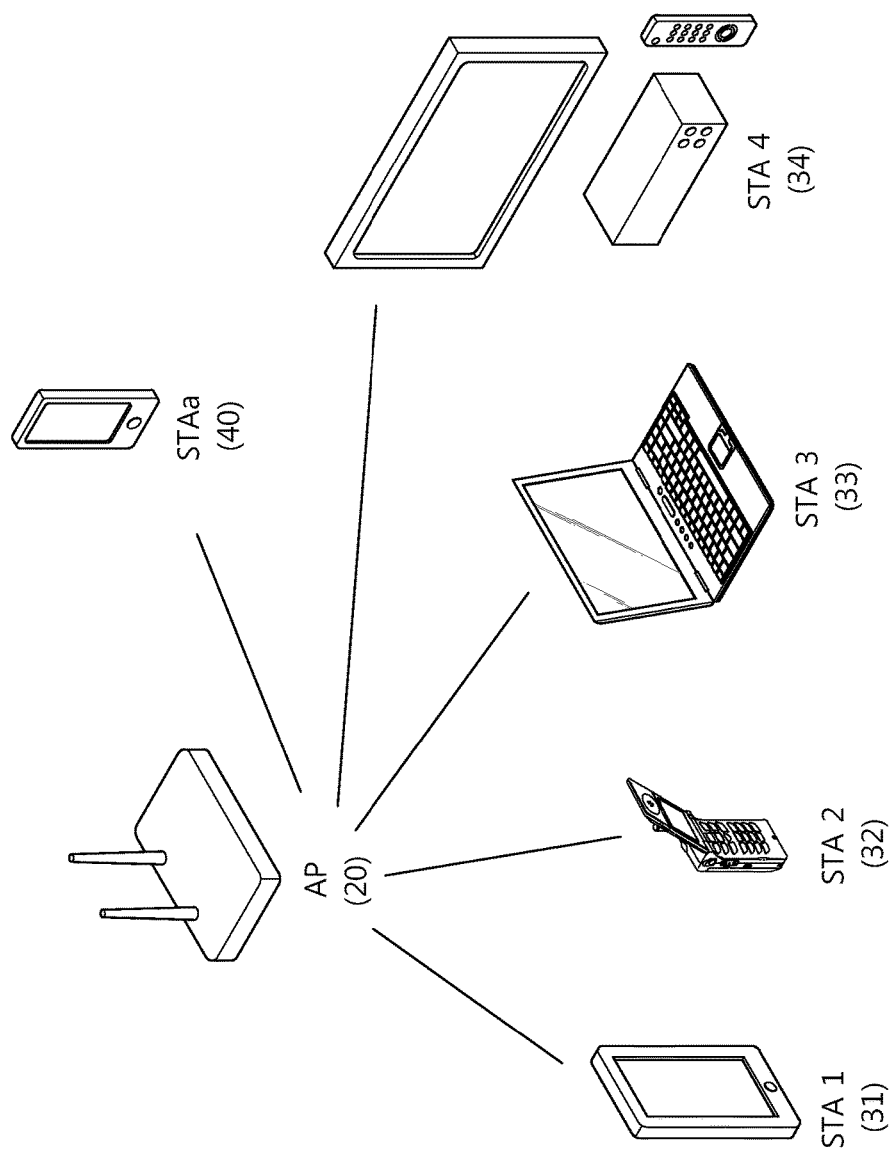
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
|---|---|---|
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
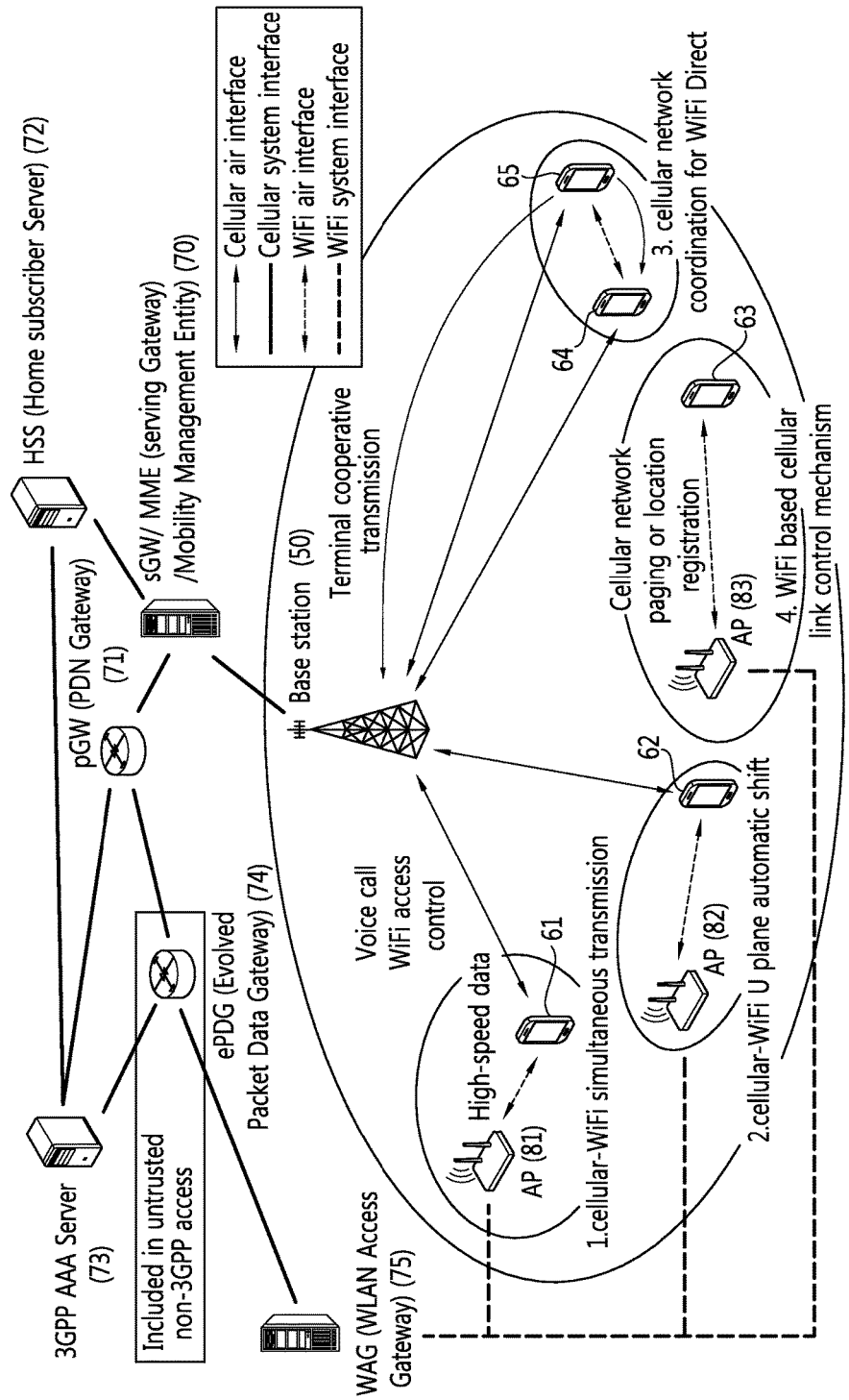
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (e-PDG) 74 through the cellular system interface. The e-PDG 74 may be included only in untrusted non-3GPP access. The e-PDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

Methods for acquiring, by an AP information management entity in a cellular network, information on APs from an AP information management server, which is located outside of the cellular network, through an interface outside of the cellular network are described below according to various embodiments of the present invention. Hereinafter, for convenience of the description, it is assumed that the primary RAT system is a 3GPP LTE (or 3GPP LTE-A) which is a cellular system, and the secondary RAT system an IEEE 802.11(Wi-Fi) which is a WLAN system. However, the embodiment of the present invention is not limited thereto. When the primary RAT system is a 3GPP LTE(-A), the AP information management entity of a primary RAT system may be one of an eNB, MME or new entity.

The AP information management server may be a device to provide a generic advertisement service (GAS) using an access network query protocol (ANQP). The ANQP is a query protocol for access network information retrieval transported by GAS public action frames. GAS provides functionality that enables STAs to discover the availability of information related to desired network services, e.g., information about services such as provided in an IBSS, local access services, available subscription service providers (SSPs) and/or subscription service provider networks (SSPNs) or other external networks. GAS uses a generic container to advertise network services' information over an IEEE 802.11 network. Public action frames are used to transport this information. Further, the AP information management server may be a WAG. A new entity may be added between the AP and the management server so that a corresponding entity may combine information on the cellular system transmitted from the AP, change a transmission format, and transmit the combined information to the management server. The added new entity may be a dual-stack gateway or an AP controller, etc. Or, in the description above, the AP information management server may be a device providing an access network discovery and selection function (ANDSF).

Figure 6:
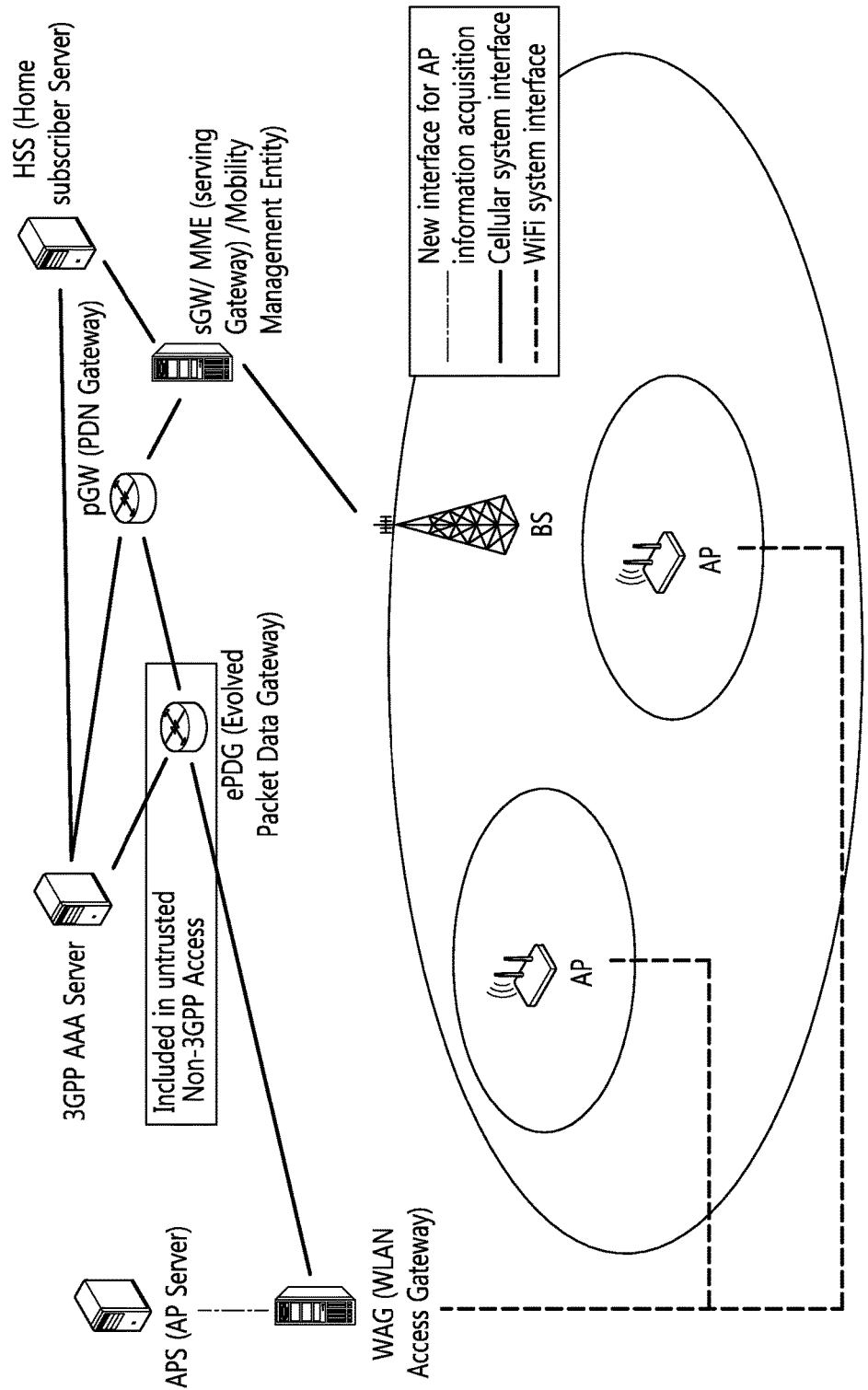
FIG. 6 shows an example of a structure of a system in which an AP information management entity may acquire AP information from an AP information management server (hereinafter, an AP server) according to an embodiment of the present invention.

FIG. 6 shows an example of a structure of a system in which an AP information management entity may acquire AP information from an AP information management server (hereinafter, an AP server) according to an embodiment of the present invention. Referring to FIG. 6, when a structure of a convergence system of a cellular system and a Wi-Fi system described in FIG. 5 is used, the AP server exists outside of the cellular system. The AP server may be connected to a WAG through a new interface for acquiring AP information. Accordingly, the information management entity may acquire AP information from the AP server through the new interface outside of the cellular network.

Embodiments of the preset invention may include various cases as follows according to what is an AP information management entity and/or which path the AP information management entity obtains AP information through.

A cellular controller (e.g., a MME), which is an AP information management entity, may obtain AP information by generating a data path or by newly defining a data path, in addition to an existing signaling path, and using the corresponding data path.

The cellular controller (e.g., the MME), which is an AP information management entity, may obtain AP information through a cellular node (e.g., S-GW, P-GW) by using the existing signaling path.

A cellular base station (e.g., BS or eNB), which is an AP information management entity, may obtain AP information through the MME.

The cellular base station (e.g., BS or eNB), which is an AP information management entity, may obtain AP information by generating a data path for obtaining AP information through the MME and using the corresponding data path.

The cellular base station (e.g., BS or eNB), which is an AP information management entity, may obtain AP information by using already known data path information of UE(s), and etc.

1) The case in which the cellular controller (e.g., the MME), which is an AP information management entity, obtains AP information by generating a data path or by newly defining a data path, in addition to an existing signaling path, and using the corresponding data path is described.

Figure 7:
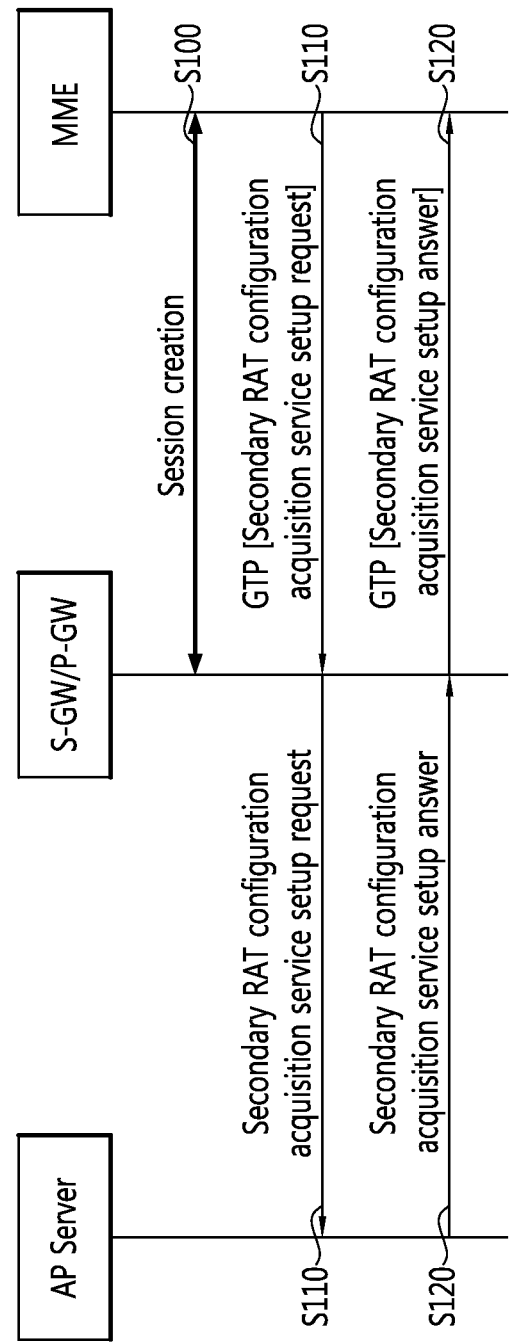
FIG. 7 shows an example of a method for obtaining AP information by an MME, which is an AP information management entity, from an AP server according to an embodiment of the present invention.

FIG. 7 shows an example of a method for obtaining AP information by an MME, which is an AP information management entity, from an AP server according to an embodiment of the present invention.

In step S100, the MME requests generation of a data path for obtaining AP information within coverage of one or more eNBs managed by the MME itself. The MME selects an appropriate S-GW/P-GW with which the MME should establish a session, and requests the S-GW/P-GW to create a session.

The MME and S-GW/P-GW may create a session by using an existing scheme. Namely, the MME and S-GW/P-GW may create a session by applying a GPRS tunneling protocol (GTP) which is referred by Section 7.2 of 3GPP TS 29.274 V11.5.0 (2012-12). In creating a session by applying the GTP, a procedure of determining an appropriate UE, etc, may be omitted. Namely, in the prior art, a session as a user data path is created only for a UE, a procedure for determining whether a UE for creating a session is appropriate is required. However, in the embodiment of the present invention, since a session for the MME is created, a procedure related to a UE may be omitted. The present invention is not limited to the creation of a session by applying the GTP, and the MME and S-GW/P-GW may create a session by applying a protocol other than the GTP. For example, the MME and S-GW/P-GW may create a session by applying a proxy mobile IPv6 protocol (PMIP) or a dual stack mobile IPv6 protocol (DSMIP).

If the session is created by applying the GTP, a create session request/response message, which is an existing message, may be used. In this case, the create session request/response message may include an indicator informing the S-GW/P-GW that the session is created for the MME, rather than a UE. Also accordingly, the create session request/response message may include a parameter related to the MME (e.g., Sender F-TEID, PGW S5/S8 Address) and may not include a parameter related to a UE (e.g., IMSI, MEI, MSISDN, user location information, protocol configuration options, etc) nor a parameter related to an eNB (e.g., H(e)NB local IP address, S1-U eNB F-TEID, etc). Also, the MME may include a reason for generating a data path (e.g., secondary RAT configuration acquisition) in the create session request message.

The MME may receive a response to the request for session creation from the S-GW/P-GW, and performs an operation according to a result ode (or a cause) within the response. If the result code is 'accept', the MME may perform an operation described in step S110 below. If the result code is 'reject', the MME may perform an operation according to the cause. For example, when the cause is "Mandatory IE missing", the MME may check a mandatory information element (IE) and corrects it, and retransmit a request for session creation. It is assumed that the result code is 'accept' in FIG. 7.

In step S110, in order for the MME to acquire information of AP existing within coverage of all or a part of eNBs which the MME manages, the MME transmits a secondary RAT configuration acquisition service setup request to the AP server. Accordingly, the MME may request service registration to the AP server. For example, the MME may transmit a secondary RAT configuration acquisition service setup request to the AP server at a time point at which the eNB first turns on power or at a time point that determines that it is necessary to apply convergence of the cellular system and the Wi-Fi system to devices within coverage of the eNB.

The secondary RAT configuration acquisition service setup request transmitted by the MME may be transferred to the AP server through the S-GW/P-GW using the created session. The MME may configure an IP packet like the existing GTP S1-U interface and transmit the secondary RAT configuration acquisition service setup request to the S-GW/P-GW.

Figure 8:
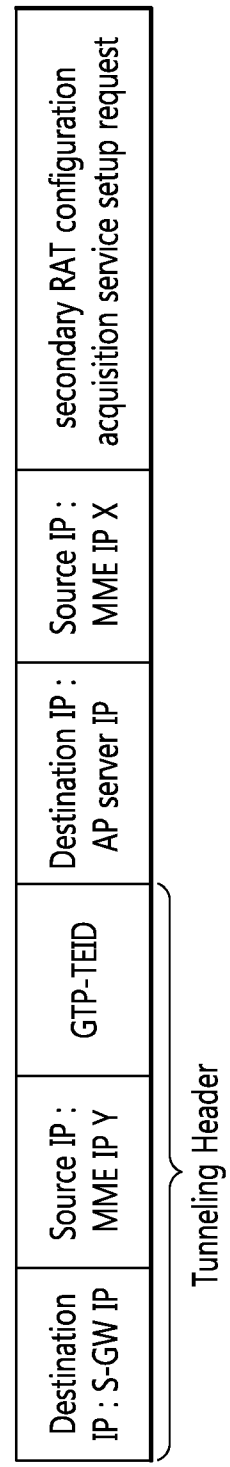
FIG. 8 shows an example of an IP packet carrying a secondary RAT configuration acquisition service setup request according to an embodiment of the present invention.

FIG. 8 shows an example of an IP packet carrying a secondary RAT configuration acquisition service setup request according to an embodiment of the present invention. Referring to FIG. 8, the IP packet includes a destination IP set as an AP server IP, a source IP set as MME IP X, and the secondary RAT configuration acquisition service setup request. The AP server IP and MME IP X may be inner IPs. Also, the IP packet includes a destination IP set as an S-GW IP, a source IP set as an MME IP Y, and a tunneling header including a GTP tunnel identifier (GTP-TEID). The S-GW IP and MME IP Y may be outer IPs. Namely, the destination IP and source IP included in the tunneling header indicate a destination and source in transmission using a GTP, respectively. The MME IP X and the MME IP Y may be identical to a private IP used in an existing cellular network or may be different. For example, the MME IP X is an IP used for a data path and the MME IP Y may be a private IP.

Further, the secondary RAT configuration acquisition service setup request may include identifier information of at least one eNB according to an AP information request range. The identifier information of at least one eNB may include eNB ID, physical cell ID and PLMN ID of each eNB. A combination of eNB ID, physical cell ID and PLMN ID may be a format of E-UTRAN cell identifier (ECI) or E-UTRAN cell global identifier (ECGI). Further, the secondary RAT configuration acquisition service setup request may additionally include a request range flag of each eNB and a location and coverage of each eNB. When the request range flag is 'all', this represents that each eNB requests information of APs within a managing entire cell. When the request range flag is 'specific cell(s)', this represents that each eNB requests information of an AP within a specific cell among managing cells.

Referring to FIG. 7 again, in step S120, upon receiving the secondary RAT configuration acquisition service setup request from the MME, the AP server transmits a secondary RAT configuration acquisition service setup answer to the MME. The secondary RAT configuration acquisition service setup answer may be transmitted from the AP server to the MME through the S-GW/P-GW using the created session. The secondary RAT configuration acquisition service setup answer may include AP information according to a request of the MME. The AP server may extract information of an AP within coverage of a minimum unit (e.g., a cell) of a request according to an AP information request range and include the information in the secondary RAT configuration acquisition service setup answer.

The AP information on a minimum unit of a request may include a MAC address (BSSID) of the AP, SSID of the AP, information (closed subscriber group (CSG) and password/open subscriber group (OSG)) on whether the AP is AP in which only a limited user can use, homogeneous ESS ID (HESSID) of the AP, information (operating class, channel number) on a frequency channel in which the AP uses, and a location of the AP.

Further, the secondary RAT configuration acquisition service setup answer may include a result code to the request of the MME, eNB ID, cell ID, PLMN ID, and a location and coverage of the eNB. The result code may be set to one of 'success', 'failure 1', and 'failure 2'. A result code set to 'success' is used to inform a peer that a request has been successfully completed. A result code set to 'failure 1' is used to inform the peer that the request has failed. A result code set to 'failure 2' is used to inform the peer that the request could not be satisfied at the time it was received, but may be able to satisfy the request in the future. When the result code is set to 'failure 2', the AP server may further include a time point that responds a request of the MME in the secondary RAT configuration acquisition service setup answer. Alternatively, the AP server may notify the MME that the AP server may respond at a time point that may respond to a request of the MME or may transmit corresponding AP information at a time point that may respond to the request of the MME.

Upon receiving the secondary RAT configuration acquisition service setup answer from the AP server, the MME determines a result code included in the secondary RAT configuration acquisition service setup answer. When the result code is 'success', the MME stores received AP information on a minimum unit of a request. When the result code is 'failure 1', the MME no longer requests AP information. When the result code is 'failure 2', the MME awaits until a time point, at which the AP server can respond to a request of the MME, included in the secondary RAT configuration acquisition service setup answer. The MME may request again later AP information at a time point at which the AP server can respond to the request of the MME. In FIG. 7, it is assumed that the result code is 'success'.

2) The case in which the cellular controller (e.g., the MME), which is an AP information management entity, obtains AP information through a cellular node (e.g., S-GW, P-GW) by using the existing signaling path will is described.

Figure 9:
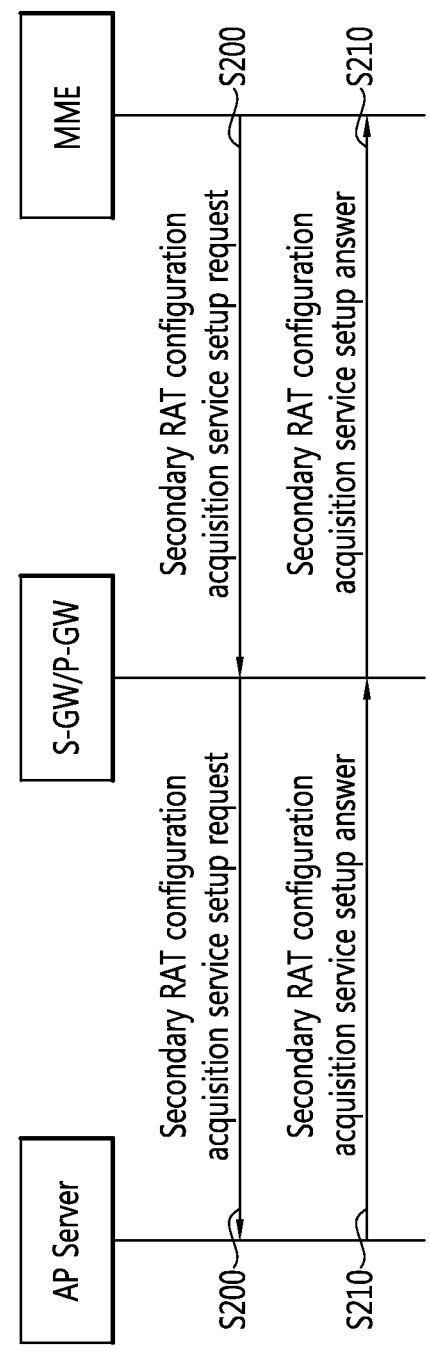
FIG. 9 shows an example of a method for obtaining AP information by an MME, which is an AP information management entity, from an AP server according to another embodiment of the present invention.

FIG. 9 shows an example of a method for obtaining AP information by an MME, which is an AP information management entity, from an AP server according to another embodiment of the present invention.

In step S200, in order for an MME to acquire information of AP existing within coverage of all or a part of eNBs which the MME manages, the MME transmits a secondary RAT configuration acquisition service setup request to the cellular node (e.g., S-GW/P-GW). Accordingly, the MME may request service registration to the S-GW/P-GW. For example, the MME may transmit a secondary RAT configuration acquisition service setup request to the S-GW/P-GW at a time point at which the eNB first turns on power or at a time point that determines that it is necessary to apply convergence of the cellular system and the Wi-Fi system to devices within coverage of the eNB. Because AP information is not UE specific information, the secondary RAT configuration acquisition service setup request may be non-UE associated signaling.

The MME may select proper S-GW/P-GW, and request the AP information from selected S-GW/P-GW by transmitting the secondary RAT configuration acquisition service setup request to the S-GW/P-GW. The secondary RAT configuration acquisition service setup request may include identifier information of each eNB according to an AP information request range. The identifier information of each eNB may include eNB ID, physical cell ID and PLMN ID of each eNB. A combination of eNB ID, physical cell ID and PLMN ID may be a format of ECI or ECGI. Further, the secondary RAT configuration acquisition service setup request may additionally include a request range flag of each eNB and a location and coverage of each eNB. When the request range flag is 'all', this represents that each eNB requests information of APs within a managing entire cell. When the request range flag is 'specific cell(s)', this represents that each eNB requests information of an AP within a specific cell among managing cells. Further, like PLMN ID, identifier information that is common to each eNB may be included only one time within the secondary RAT configuration acquisition service setup request.

The S-GW forwards the received secondary RAT configuration acquisition service setup request to the P-GW. The P-GW transmits the received secondary RAT configuration acquisition service setup request to an AP server. The P-GW may search for an AP to which the secondary RAT configuration acquisition service setup request is to be transmitted. When the P-GW transmits the secondary RAT configuration acquisition service setup request to the AP server, a source IP is an IP of the P-GW and a destination IP is an IP of the AP server. Namely, a message transmitted between the MME and the S-GW/P-GW is recognized as signaling and transmitted by using the existing signaling interface S11. Meanwhile, a message transmitted between the S-GW/P-GW and the AP server is recognized as data, and the data is transmitted like a general IP packet. AP information, which is recognized by the AP server that it has been requested by the P-GW, has been requested by the MME in actuality.

In step S210, upon receiving the secondary RAT configuration acquisition service setup request from the S-GW/P-GW, the AP server transmits a secondary RAT configuration acquisition service setup answer to the S-GW/P-GW. The secondary RAT configuration acquisition service setup answer may include AP information according to a request of the MME. The AP server may extract information of an AP within coverage of a minimum unit (e.g., a cell) of a request according to an AP information request range and include the information in the secondary RAT configuration acquisition service setup answer.

The secondary RAT configuration acquisition service setup answer may be transmitted from the AP server to the MME through the S-GW/P-GW. A Command-Code value for identifying the secondary RAT configuration acquisition service setup answer transmitted from the AP server to the P-GW using an interface therebetween may be defined. The Command-Code value may be allocated by Internet assigned numbers authority (IANA) in Internet engineering task force (IETF) request for comments (RFC) 5516.

The AP information on a minimum unit of a request may include a MAC address (BSSID) of the AP, SSID of the AP, information (CSG and password/OSG) on whether the AP is AP in which only a limited user can use, HESSID of the AP, information (operating class, channel number) on a frequency channel in which the AP uses, and a location of the AP.

Further, the secondary RAT configuration acquisition service setup answer may include a result code to the request of the MME, eNB ID, cell ID, PLMN ID, and a location and coverage of the eNB. The result code may be set to one of 'success', 'failure 1', and 'failure 2'. A result code set to 'success' is used to inform a peer that a request has been successfully completed. A result code set to 'failure 1' is used to inform the peer that the request has failed. A result code set to 'failure 2' is used to inform the peer that the request could not be satisfied at the time it was received, but may be able to satisfy the request in the future. When the result code is set to 'failure 2', the AP server may further include a time point that responds a request of the MME in the secondary RAT configuration acquisition service setup answer. Alternatively, the AP server may notify the MME that the AP server may respond at a time point that may respond to a request of the MME or may transmit corresponding AP information at a time point that may respond to the request of the MME.

Upon receiving the secondary RAT configuration acquisition service setup answer from the AP server, the MME determines a result code included in the secondary RAT configuration acquisition service setup answer. When the result code is 'success', the MME stores received AP information on a minimum unit of a request. When the result code is 'failure 1', the MME no longer requests AP information. When the result code is 'failure 2', the MME awaits until a time point, at which the AP server can respond to a request of the MME, included in the secondary RAT configuration acquisition service setup answer. The MME may request again later AP information at a time point at which the AP server can respond to the request of the MME. In FIG. 9, it is assumed that the result code is 'success'.

3) The case in which a cellular base station (e.g., a BS or an eNB), which is an AP information management entity, obtains AP information through the MME is described.

Figure 10:
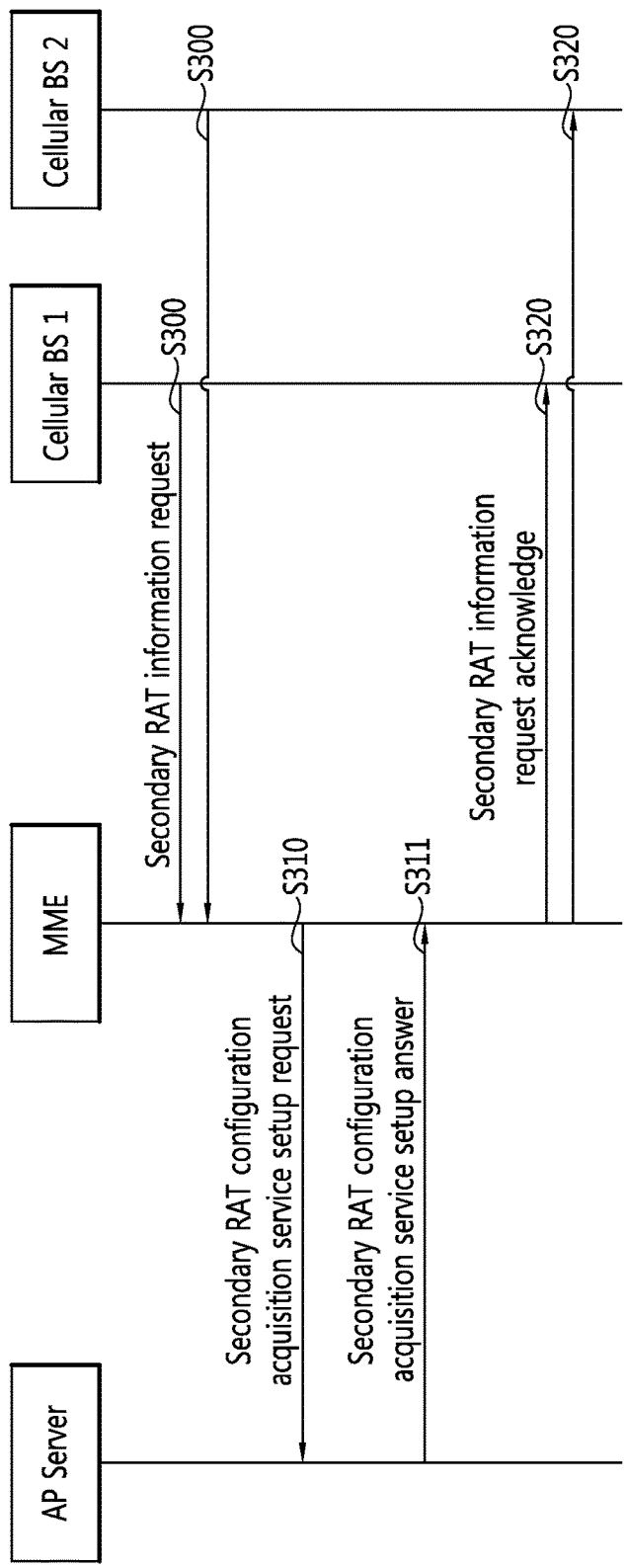
FIG. 10 shows an example of a method for obtaining AP information by an eNB, which is an AP information management entity, from an AP server according to an embodiment of the present invention.

FIG. 10 shows an example of a method for obtaining AP information by an eNB, which is an AP information management entity, from an AP server according to an embodiment of the present invention.

In step S300, in order for an eNB1/eNB2 to acquire information of an AP existing within coverage thereof, the eNB1/eNB2 transmits a secondary RAT information request to an MME. For example, the eNB may transmit a secondary RAT information request to the MME at a time point at which the eNB first turns on power or at a time point that determines that it is necessary to apply convergence of the cellular system and the Wi-Fi system to devices within coverage of the eNB. Because AP information is not UE specific information, the secondary RAT information request may be non-UE associated signaling.

When the eNB transmits the secondary RAT information request, an S1 application protocol, which is an existing cellular system interface, may be used. When the eNB and the MME perform an AP information request/response through an S1 interface, transmitted messages each are identified by a Message Type IE. Table 2 represents an example of Message Type IE.

of Message field may be one of 'Initiating Message', 'Successful Outcome', and 'Unsuccessful Outcome'. For example, when the Type of Message field is an 'Initiating message', this is a secondary RAT information request in which the eNB transmits to the MME, and a corresponding message becomes a SecondaryRATInformationRequest message. Alternatively, when a Type of Message field is 'Successful Outcome', this is a response in which the MME transmits to the eNB when a request of the eNB is succeeded, and a corresponding message becomes a SecondaryRATInformationRequestAcknowledge message. This will be described later. Alternatively, when a Type of Message field is 'Unsuccessful Outcome', this is a response in which the MME transmits to the eNB when a request of the eNB is failed, and a corresponding message becomes a SecondaryRATInformationRequestFailure message. This will be described later. Further, criticality of the Message Type IE may be 'reject'. This is error handling when the MME cannot recognize or analyze a request of the eNB and represents that a reject procedure is performed.

Further, the secondary RAT information request may include a request range flag. When the request range flag is 'all', this represents that the eNB requests information of APs within managing entire cells. When the request range

TABLE 2

| IE/Group Name | Presence | Range | IE type and reference | Semantics description |
|---|---|---|---|---|
| Message Type | | | | Assumed max no of messages is 256. |
| >Procedure Code | M | | (Handover Preparation, Handover Resource Allocation, Handover Notification, Path Switch Request, Handover Cancellation E-RAB Setup, E-RAB Modify, E-RAB Release, E-RAB Release Indication, Initial Context Setup, Paging, Downlink NAS transport, Initial UE Message, Uplink NAS transport, Reset, Error Indication, NAS Non Delivery Indication, S1 Setup, UE Context Release Request, UE Context Release, Downlink S1 CDMA2000 Tunneling, Uplink S1 CDMA2000 Tunneling; UE Context Modification, UE Capability Info Indication, eNB Status Transfer, MME Status Transfer, Deactivate Trace, Trace Start, Trace Failure Indication, eNB Configuration Update, MME Configuration Update, Location Reporting Control, Location Reporting Failure Indication, Location Report, Overload Start, Over load Stop, Private Message, Write-Replace Warning, eNB Direct Information Transfer, MME Direct Information Transfer, Cell Traffic Trace, eNB Configuration Transfer, MME Configuration Transfer, Downlink UE Associated LPPa transport, Uplink UE Associated LPPa transport, Downlink Non UE Associated LPPa transport, Uplink Non UE Associated LPPa transport, Kill, UE Radio Capability Match, . . . ) | |
| >Type of Message | M | | CHOICE (Initiating Message, Successful Outcome, Unsuccessful Outcome, . . . ) | |

Referring to Table 2, Message Type IE includes a Procedure Code field. The Procedure Code field may be an id-SecondaryRATInformationRequest. Accordingly, it may be seen that a corresponding message is a message related to AP information acquisition. Further, Message Type IE includes a Type of Message field. When the Procedure Code field is an id-SecondaryRATInformationRequest, the Type flag is 'specific cell(s)', this represents that the eNB requests information of an AP within a specific cell among managing cells. That is, the request range flag indicates a range in which the eNB requests AP information. Further, the secondary RAT information request may further include a cell ID. This may be physical cell ID according to an AP information request range.

In step S310, upon receiving the secondary RAT information request from the eNB, the MME transmits a secondary RAT configuration acquisition service setup request to the AP server and requests service registration for acquiring AP information. The MME may request only information of the AP corresponding to the eNB, which transmits the secondary RAT information request. Alternatively, the MME may request information of APs corresponding to all or a part of eNBs which the MME manages. For an eNB which does not transmit the secondary RAT information request, this may be terminated with onetime acquisition event. In step S311, the MME receives a secondary RAT configuration acquisition service setup answer from the AP server.

Transmission of the secondary RAT configuration acquisition service setup request/answer between the MME and AP server may follow the embodiment of FIG. 7 or 9 as described above. In the case of following the embodiment of FIG. 7, the MME generate a data path or newly define a data path, in addition to an existing signaling path, and obtain AP information from an AP server by using the corresponding data path. Namely, the MME may create a session with the S-GW/P-GW, transmit the secondary RAT configuration acquisition service setup request to the AP server using the created session, and receive a secondary RAT configuration acquisition service setup answer from the AP server. Alternatively, in the case of following the embodiment of FIG. 9, the MME may obtain AP information from the AP server through a cellular node (e.g., S-GW, P-GW) by using the existing signaling path. Namely, the MME transmits the secondary RAT configuration acquisition service setup request to the AP server through the S-GW/P-GW by using the existing signaling interface S11, and receive the secondary RAT configuration acquisition service setup answer from the AP server.

In step S320, upon receiving the secondary RAT configuration acquisition service setup answer from the AP server, the MME transmits secondary RAT information request acknowledge or secondary RAT information request failure to each eNB. The MME receives the secondary RAT configuration acquisition service setup answer and determines a result code included in the secondary RAT configuration acquisition service setup answer. When the result code is 'success', the MME transmits secondary RAT information request acknowledge including AP information on a minimum unit of a request corresponding to each eNB to the each eNB. When the result code is 'failure' (including failure 1 and failure 2), the MME transmits secondary RAT information request failure to corresponding each eNB. In FIG. 10, it is assumed that the result code is 'success'.

Secondary RAT information request acknowledge or secondary RAT information request failure may be transmitted using an S1 application protocol. Secondary RAT information request acknowledge may be transmitted through a SecondaryRATInformationRequestAcknowledge message in which a type of message field is 'Successful Outcome'. Secondary RAT information request failure may be transmitted through a SecondaryRATInformationRequestFailure message in which a Type of Message field is 'Unsuccessful Outcome'.

AP information included in the secondary RAT information request acknowledge may include a MAC address (BSSID) of the AP, SSID of the AP, information (CSG and password/OSG) on whether the AP is an AP in which only a limited user can use, HESSID of the AP, information (operating class, channel number) about a frequency channel in which the AP uses, and a location of the AP. Further, the secondary RAT information request acknowledge may include a cell ID.

Further, the secondary RAT information request acknowledge or the secondary RAT information request failure may include a result code. The result code may be set to one of 'success', 'failure 1', and 'failure 2'. A result code set to 'success' is used to inform a peer that a request has been successfully completed. A result code set to 'failure 1' is used to inform the peer that the request has failed. A result code set to 'failure 2' is used to inform the peer that the request could not be satisfied at the time it was received, but may be able to satisfy the request in the future. When the result code of the secondary RAT information request failure is 'failure 2', the secondary RAT information request failure may further include a re-request time point.

Upon receiving the secondary RAT information request acknowledge from the MME, the eNB stores received AP information on a minimum unit of a request. Upon receiving the secondary RAT information request failure from the MME, the eNB determines a result code included in the secondary RAT information request failure. When the result code is 'failure 1', the eNB no longer requests AP information. When the result code is 'failure 2', the eNB awaits until a re-request time point included in the secondary RAT information request failure. The eNB may request again AP information at a corresponding re-request time point later.

4) The case in which the cellular base station (e.g., BS or eNB), which is an AP information management entity, obtains AP information by generating a data path for obtaining AP information through the MME and using the corresponding data path is described.

Figure 11:
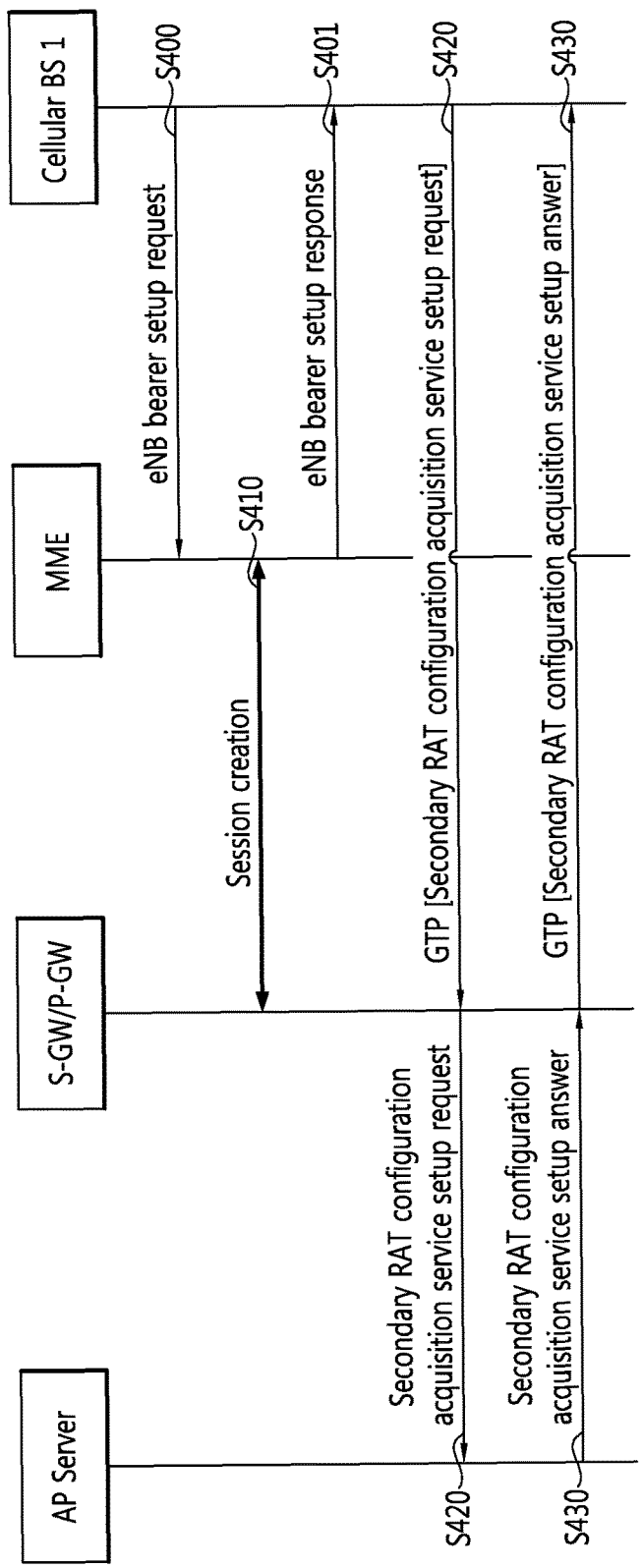
FIG. 11 shows an example of a method for obtaining AP information by an eNB, which is an AP information management entity, from an AP server according to another embodiment of the present invention.

FIG. 11 shows an example of a method for obtaining AP information by an eNB, which is an AP information management entity, from an AP server according to another embodiment of the present invention.

Accordingly, the eNB may request creation of a data path in order to acquire information of an AP existing within coverage of the eNB. Because AP information is not UE specific information, the secondary RAT information request may be non-UE associated signaling.

When the eNB transmits the eNB bearer setup request, an S1 application protocol, which is an existing cellular system interface, may be used. When the eNB and the MME perform an eNB bearer setup request/response through an S1 interface, transmitted messages each are identified by a Message Type IE described in Table 2 above. The Procedure Code field may be an id-eNBNearerSetupRequest. Accordingly, it may be seen that a corresponding message is a message related to eNB bearer setup. Further, when the Type of Message field is an 'Initiating message', this is an eNB bearer setup request in which the eNB transmits to the MME, and a corresponding message becomes an eNBBearerSetupRequest message. Alternatively, when a Type of Message field is 'Successful Outcome', this is a response in which the MME transmits to the eNB when a request of the eNB is succeeded, and a corresponding message becomes an eNBBearerSetupResponse message. Alternatively, when a Type of Message field is 'Unsuccessful Outcome', this is a response in which the MME transmits to the eNB when a request of the eNB is failed, and a corresponding message becomes an eNBBearerSetupFailure message. Further, criticality of the Message Type IE may be 'reject'. This is error handling when the MME cannot recognize or analyze a request of the eNB and represents that a reject procedure is performed.

Further, the eNB bearer setup request may include additional parameters. The eNB bearer setup request may include a cause (e.g., secondary RAT configuration acquisition) for creating of the data path. The eNB bearer setup request may further include an E-RAB ID, transport network layer (TNL) address for eNB, and GTP-TEID for DL.

In step S410, upon receiving the eNB bearer setup request, the MME generates a session by selecting an appropriate S-GW/P-GW with which the MME should establish a session according to a cause included in the eNB bearer setup request, and delivers an E-RAB ID, TNL address, and GTP-TEID for DL, included in the eNB bearer setup request, to the selected S-GW/P-GW.

The MME and S-GW/P-GW may create a session by using an existing scheme. Namely, the MME and S-GW/P-GW may create a session by applying a GPRS tunneling protocol (GTP) which is referred by Section 7.2 of 3GPP TS 29.274 V11.5.0 (2012-12). In creating a session by applying the GTP, a procedure of determining an appropriate UE, etc, may be omitted. Namely, in the prior art, a session as a user data path is created only for a UE, a procedure for determining whether a UE for creating a session is appropriate is required. However, in the embodiment of the present invention, since a session for the eNB is created, a procedure related to a UE may be omitted. The present invention is not limited to the creation of a session by applying the GTP, and the MME and S-GW/P-GW may create a session by applying a protocol other than the GTP. For example, the MME and S-GW/P-GW may create a session by applying a PMIP or DSMIP.

If the session is created by applying the GTP, a create session request/response message, an existing message, may be used. In this case, the create session request/response message may include an indicator informing the S-GW/P-GW that the session is created for the eNB, rather than a UE. Also accordingly, the create session request/response message may not include a parameter related to a UE (e.g., IMSI, MEI, MSISDN, user location information, protocol configuration options, etc).

The MME transmits a message to the eNB according to the result of the session creation. When the session creation is successful, the MME transmits an eNB bearer setup response including an E-RB ID, TNL address for S-GW, GTP-TEID for UL, and TNL address for AP server to the eNB. Since The GTP-TEID is an ID allocated per UE, the GTP-TEID for UL for UL transmission of the eNB should be allocated. When the session creation fails, the MME transmits an eNB bearer setup failure including a result code to the eNB.

In step S401, upon receiving the eNB bearer setup response, the eNB stores the E-RAB ID, TNL address, and GTP-TEID for UL included in the eNB bearer setup response. If the eNB receives eNB bearer setup failure, the eNB checks a result code included in the eNB bearer setup failure. It is assumed that the eNB bearer setup response is received in FIG. 11.

In step S420, in order for the eNB to acquire information of an AP existing within coverage of the eNB, the eNB transmits a secondary RAT configuration acquisition service setup request to the AP server through the data path created by the eNB bearer setup procedure. Accordingly, the eNB may request service registration to the AP server. For example, the eNB may transmit a secondary RAT configuration acquisition service setup request to the AP server at a time point at which the eNB first turns on power or at a time point that determines that it is necessary to apply convergence of the cellular system and the Wi-Fi system to devices within coverage of the eNB.

The secondary RAT configuration acquisition service setup request transmitted by the eNB may be transferred to the AP server through the S-GW/P-GW by using the created session. The eNB may configure an IP packet like the existing GTP S1-U interface and transmit the secondary RAT configuration acquisition service setup request to the S-GW/P-GW.

FIG. 12 shows an example of an IP packet carrying a secondary RAT configuration acquisition service setup request according to another embodiment of the present invention. Referring to FIG. 12, the IP packet includes a destination IP set as an AP server IP, a source IP set as eNB IP X, and the secondary RAT configuration acquisition service setup request. The AP server IP and eNB IP X may be inner IPs. Also, the IP packet includes a destination IP set as an S-GW IP, a source IP set as an eNB IP Y, and a tunneling header including a GTP-TEID for UL. The S-GW IP and eNB IP Y may be outer IPs. Namely, the destination IP and source IP included in the tunneling header indicate a destination and source in transmission using a GTP, respectively. The eNB IP X and eNB IP Y may be identical to a private IP used in an existing cellular network or may be different. For example, the eNB IP X is an IP used for a data path and the eNB IP Y may be a private IP.

Further, the secondary RAT configuration acquisition service setup request may include identifier information of the eNB according to an AP information request range. The identifier information of the eNB may include eNB ID, physical cell ID and PLMN ID of the eNB. A combination of eNB ID, physical cell ID and PLMN ID may be a format of ECI or ECGI. Further, the secondary RAT configuration acquisition service setup request may additionally include a request range flag of the eNB and a location and coverage of the eNB. When the request range flag is 'all', this represents that the eNB requests information of APs within a managing entire cell. When the request range flag is 'specific cell(s)', this represents that the eNB requests information of an AP within a specific cell among managing cells.

Referring to FIG. 11 again, in step S430, upon receiving the secondary RAT configuration acquisition service setup request from the eNB, the AP server transmits a secondary RAT configuration acquisition service setup answer to the eNB. The secondary RAT configuration acquisition service setup answer may be transmitted from the AP server to the eNB through the S-GW/P-GW using the created session. The secondary RAT configuration acquisition service setup answer may include AP information according to a request of the eNB. The AP server may extract information of an AP within coverage of a minimum unit (e.g., a cell) of a request according to an AP information request range and include the information in the secondary RAT configuration acquisition service setup answer.

The AP information on a minimum unit of a request may include a MAC address (BSSID) of the AP, SSID of the AP, information (CSG and password/OSG) on whether the AP is AP in which only a limited user can use, HESSID of the AP, information (operating class, channel number) on a frequency channel in which the AP uses, and a location of the AP.

Further, the secondary RAT configuration acquisition service setup answer may include a result code to the request of the eNB, eNB ID, cell ID, PLMN ID, and a location and coverage of the eNB. The result code may be set to one of 'success', 'failure 1', and 'failure 2'. A result code set to 'success' is used to inform a peer that a request has been successfully completed. A result code set to 'failure 1' is used to inform the peer that the request has failed. A result code set to 'failure 2' is used to inform the peer that the request could not be satisfied at the time it was received, but may be able to satisfy the request in the future. When the result code is set to 'failure 2', the AP server may further include a time point that responds a request of the eNB in the secondary RAT configuration acquisition service setup answer. Alternatively, the AP server may notify the eNB that the AP server may respond at a time point that may respond to a request of the eNB or may transmit corresponding AP information at a time point that may respond to the request of the eNB.

Upon receiving the secondary RAT configuration acquisition service setup answer from the AP server, the eNB determines a result code included in the secondary RAT configuration acquisition service setup answer. When the result code is 'success', the eNB stores received AP information on a minimum unit of a request. When the result code is 'failure 1', the eNB no longer requests AP information. When the result code is 'failure 2', the eNB awaits until a time point, at which the AP server can respond to a request of the eNB, included in the secondary RAT configuration acquisition service setup answer. The eNB may request again later AP information at a time point at which the AP server can respond to the request of the eNB. In FIG. 11, it is assumed that the result code is 'success'.

Meanwhile, in an environment in which local IP access (LIPA) is available, the eNB may obtain AP information from the AP server through a local GW, without going through the S-GW/P-GW. In this case, the eNB bearer setup request transmitted by the eNB may include a local GW address, and the eNB bearer setup response received by the eNB may include a local GW GTP-TEID for UL.

5) The case in which the cellular base station (e.g., the BS or the eNB), which is an AP information management entity, obtains AP information by using already known data path information of UE(s), etc, is described.

Figure 13:
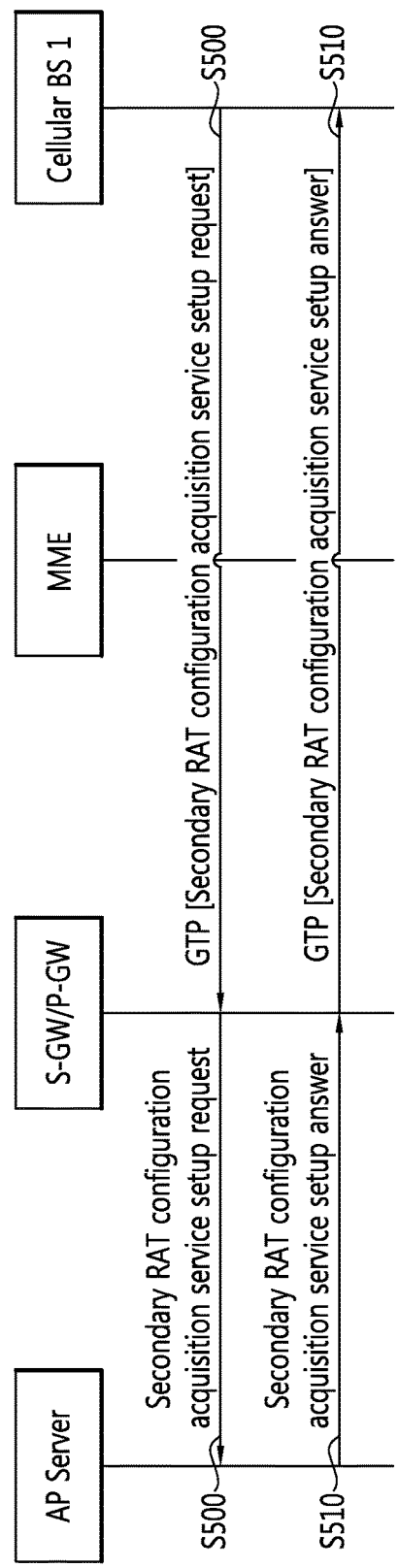
FIG. 13 shows an example of a method for obtaining AP information by an eNB, which is an AP information management entity, from an AP server according to another embodiment of the present invention.

FIG. 13 shows an example of a method for obtaining AP information by an eNB, which is an AP information management entity, from an AP server according to another embodiment of the present invention.

In step S500, in order for an eNB to acquire information of an AP existing within coverage of the eNB, the eNB transmits a secondary RAT configuration acquisition service setup request to the AP server. Accordingly, the eNB may request service registration to the AP server. For example, the eNB may transmit a secondary RAT configuration acquisition service setup request to the AP server at a time point at which the eNB first turns on power or at a time point that determines that it is necessary to apply convergence of the cellular system and the Wi-Fi system to devices within coverage of the eNB.

The secondary RAT configuration acquisition service setup request transmitted by the eNB may be transferred to the AP server through the S-GW/P-GW. The eNB may configure an IP packet like the existing GTP S1-U interface and transmit the secondary RAT configuration acquisition service setup request to the S-GW/P-GW. The IP packet described in FIG. 12 may be used. However, the GTP-TEID should be defined in both DL/UL directions in advance. Also, to which path (S-GW/P-GW) the secondary RAT configuration acquisition service setup request should be transmitted should be determined by using data path information of UEs managed by the eNB.

Further, the secondary RAT configuration acquisition service setup request may include identifier information of the eNB according to an AP information request range. The identifier information of the eNB may include eNB ID, physical cell ID and PLMN ID of the eNB. A combination of eNB ID, physical cell ID and PLMN ID may be a format of ECI or ECGI. Further, the secondary RAT configuration acquisition service setup request may additionally include a request range flag of the eNB and a location and coverage of the eNB. When the request range flag is 'all', this represents that the eNB requests information of APs within a managing entire cell. When the request range flag is 'specific cell(s)', this represents that the eNB requests information of an AP within a specific cell among managing cells.

In step S510, upon receiving the secondary RAT configuration acquisition service setup request from the eNB, the AP server transmits a secondary RAT configuration acquisition service setup answer to the eNB. The secondary RAT configuration acquisition service setup answer may be transmitted from the AP server to the eNB through the S-GW/P-GW. The secondary RAT configuration acquisition service setup answer may include AP information according to a request of the eNB. The AP server may extract information of an AP within coverage of a minimum unit (e.g., a cell) of a request according to an AP information request range and include the information in the secondary RAT configuration acquisition service setup answer.

The AP information on a minimum unit of a request may include a MAC address (BSSID) of the AP, SSID of the AP, information (CSG and password/OSG) on whether the AP is AP in which only a limited user can use, HESSID of the AP, information (operating class, channel number) on a frequency channel in which the AP uses, and a location of the AP.

Further, the secondary RAT configuration acquisition service setup answer may include a result code to the request of the eNB, eNB ID, cell ID, PLMN ID, and a location and coverage of the eNB. The result code may be set to one of 'success', 'failure 1', and 'failure 2'. A result code set to 'success' is used to inform a peer that a request has been successfully completed. A result code set to 'failure 1' is used to inform the peer that the request has failed. A result code set to 'failure 2' is used to inform the peer that the request could not be satisfied at the time it was received, but may be able to satisfy the request in the future. When the result code is set to 'failure 2', the AP server may further include a time point that responds a request of the eNB in the secondary RAT configuration acquisition service setup answer. Alternatively, the AP server may notify the eNB that the AP server may respond at a time point that may respond to a request of the eNB or may transmit corresponding AP information at a time point that may respond to the request of the eNB.

Upon receiving the secondary RAT configuration acquisition service setup answer from the AP server, the eNB determines a result code included in the secondary RAT configuration acquisition service setup answer. When the result code is 'success', the eNB stores received AP information on a minimum unit of a request. When the result code is 'failure 1', the eNB no longer requests AP information. When the result code is 'failure 2', the eNB awaits until a time point, at which the AP server can respond to a request of the eNB, included in the secondary RAT configuration acquisition service setup answer. The eNB may request again later AP information at a time point at which the AP server can respond to the request of the eNB. In FIG. 11, it is assumed that the result code is 'success'.

Meanwhile, in an environment in which LIPA is available, the eNB may obtain AP information from the AP server through a local GW, without going through the S-GW/P-GW. In this case, the eNB bearer setup request transmitted by the eNB may include a local GW address, and the eNB bearer setup response received by the eNB may include a local GW GTP-TEID for UL. The local GW GTP-TEID should be defined in both DL/UL directions in advance.

So far, the cases in which the AP information management entity is an eNB or an MME have been described, but the AP information management entity may be a new entity of a cellular system. In this case, the new entity may operate like the MME of FIG. 7 or 9 or the eNB of FIG. 10 or 11 to obtain AP information from the AP server.

Figure 14:
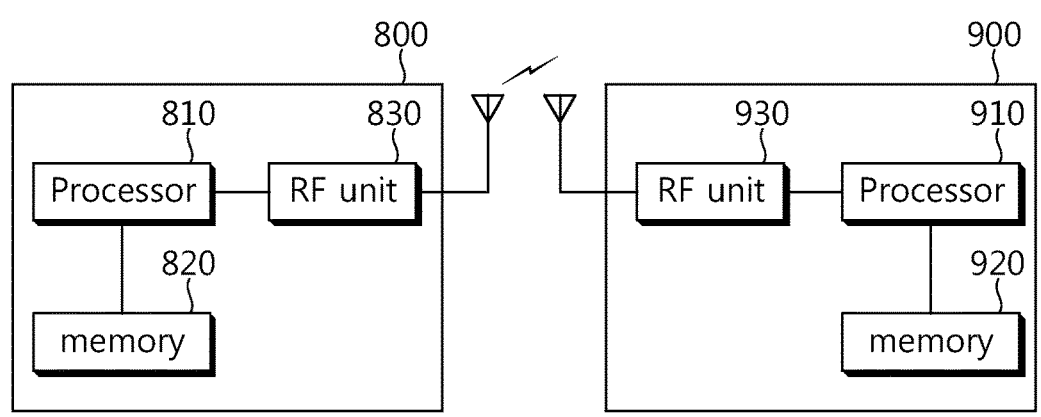
FIG. 14 is a block diagram showing wireless communication system to implement an embodiment of the present invention.

FIG. 14 is a block diagram showing wireless communication system to implement an embodiment of the present invention.

An AP server 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB, MME, or new entity of a cellular system 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for acquiring information on an access point (AP) in a wireless communication system, the method comprising:

transmitting, by an eNodeB (eNB) of a cellular system, a request for the information on the AP, which is located within coverage of the eNB, to a management server, wherein the management server is located outside of the cellular system and maintains the information received through a wireless local area network (WLAN) interface from the AP, wherein the information on the AP includes at least one of a media access control (MAC) address of the AP, a service set identifier (SSID) of the AP, a homogeneous extended service set ID (HESSID) of the AP, whether of the AP is used by a limited user, information on a frequency channel used by the AP, or a position of the AP; and receiving, by the eNB, a response, which includes a result code of the request, from the management server, wherein the result code of the request is 'success', wherein the response further includes the information on the AP.

2. The method of claim 1, wherein the request is transmitted to the management server through a mobility management entity (MME) using an S1 application protocol, and wherein the response is received from the management server through the MME using the S1 application protocol.

3. The method of claim 1, wherein the request is transmitted to the management server through a serving gateway (S-GW) and a packet data network (PDN) gateway (P-GW) using a GPRS tunneling protocol (GTP), and wherein the response is received from the management server through the S-GW and P-GW using the GTP.

4. The method of claim 3, further comprising:

transmitting an eNB bearer setup request, including an E-UTRAN radio access bearer (E-RAB) identifier (ID), transport network layer (TNL) address for the eNB, and GTP tunneling identifier (GTP-TEID) for downlink (DL), to an MME; and receiving an eNB bearer setup response, including the E-RAB ID, TNL address for the S-GW, TNL address for the management server, and GTP-TEID for uplink (UL), from the MME.

5. A method for acquiring information on an access point (AP) in a wireless communication system, the method comprising:

transmitting, by a mobility management entity (MME) of a cellular system, a request for the information on the AP, which is located within coverage of an eNodeB (eNB) managed by the MME, to a management server through a serving gateway (S-GW) and a packet data network (PDN) gateway (P-GW), wherein the management server is located outside of the cellular system and maintains the information received through a wireless local area network (WLAN) interface from the AP, wherein the information on the AP includes at least one of a media access control (MAC) address of the AP, a service set identifier (SSID) of the AP, a homogeneous extended service set ID (HESSID) of the AP, whether of the AP is used by a limited user, information on a frequency channel used by the AP, or a position of the AP; and receiving a response, which includes a result code of the request, from the management server through the S-GW and P-GW, wherein the result code of the request is 'success', wherein the response further includes the information on the AP.

6. The method of claim 5, further comprising:

transmitting a create session request message to the S-GW for creating a session between the MME and S-GW; and receiving a create session response message from the S-GW.

7. A method for transmitting information on an access point (AP) in a wireless communication system, the method comprising:

receiving, by a management server receiving the information from the AP which is located within coverage of an eNodeB (eNB) of a cellular system, a request for the information on the AP from the eNB which manages the information on the AP, wherein the information on the AP includes at least one of a media access control (MAC) address of the AP, a service set identifier (SSID) of the AP, a homogeneous extended service set ID (HESSID) of the AP, whether of the AP is used by a limited user, information on a frequency channel used by the AP, or a position of the AP; and transmitting, by the management server, a response, which includes a result code of the request, to the entity of the cellular system, wherein the result code of the request is 'success', wherein the response further includes the information on the AP.

8. The method of claim 7, wherein the management server is one of a generic advertisement service (GAS) server using an access network query protocol (ANQP) or a WLAN access gateway (WAG).

9. The method of claim 7, wherein the request is received from the eNB through a mobility management entity (MME) using an S1 application protocol, and wherein the response is transmitted to the eNB through the MME using the S1 application protocol.

10. The method of claim 7, wherein the entity of the cellular system is an eNodeB (eNB), wherein the request is received from the eNB through a serving gateway (S-GW) and a packet data network (PDN) gateway (P-GW) using a GPRS tunneling protocol (GTP), and wherein the response is transmitted to the eNB through the S-GW and P-GW using the GTP.

11. The method of claim 7, wherein the entity of the cellular system is an MME, wherein the request is received from the MME through a S-GW and P-GW using a GTP, and wherein the response is transmitted to the MME through the S-GW and P-GW using the GTP.

* * * * *